(12) United States Patent
Mori

(10) Patent No.: US 7,061,209 B2
(45) Date of Patent: Jun. 13, 2006

(54) BATTERY CHARGERS

(75) Inventor: Tatsuki Mori, Anjo (JP)

(73) Assignee: Makita Corporation, Anjo (JP)

( * ) Notice: Subject to any disclaimer, the term of this patent is extended or adjusted under 35 U.S.C. 154(b) by 54 days.

(21) Appl. No.: 10/754,762

(22) Filed: Jan. 9, 2004

(65) Prior Publication Data

US 2004/0145349 A1  Jul. 29, 2004

(30) Foreign Application Priority Data

Jan. 14, 2003  (JP) .............................. 2003-006354

(51) Int. Cl.
*H02J 7/16* (2006.01)
(52) U.S. Cl. .................. 320/150; 320/152; 320/153
(58) Field of Classification Search ................ 320/150, 320/151, 152, 153, 154
See application file for complete search history.

(56) References Cited

U.S. PATENT DOCUMENTS

| | | | |
|---|---|---|---|
| 4,374,355 A | 2/1983 | Steigerwald et al. .......... 320/43 |
| 4,850,006 A | 7/1989 | Sasaki et al. .................. 379/58 |
| 5,459,335 A | 10/1995 | Matsushita et al. ............ 257/59 |
| 5,548,202 A | 8/1996 | Schramm et al. ............. 322/33 |
| 5,767,659 A * | 6/1998 | Farley ......................... 320/106 |
| 5,828,203 A | 10/1998 | Lindeboom et al. ......... 320/150 |
| 6,075,347 A | 6/2000 | Sakakibara .................. 320/150 |
| 6,124,698 A | 9/2000 | Sakakibara .................. 320/110 |
| 6,191,560 B1 | 2/2001 | Sakakibara .................. 320/150 |
| 6,204,639 B1 * | 3/2001 | Takano et al. ............... 320/150 |
| 6,204,640 B1 | 3/2001 | Sakakibara .................. 320/150 |
| 6,204,641 B1 | 3/2001 | Sakakibara .................. 320/153 |
| 6,225,786 B1 | 5/2001 | Muramatsu et al. ........ 320/150 |
| 6,275,009 B1 | 8/2001 | Sakakibara et al. ......... 320/134 |
| 6,278,261 B1 | 8/2001 | Sakakibara .................. 320/150 |
| 6,353,305 B1 | 3/2002 | Cannon et al. ............. 320/141 |
| 6,362,600 B1 | 3/2002 | Sakakibara .................. 320/150 |
| 6,373,228 B1 | 4/2002 | Sakakibara .................. 320/150 |
| 6,404,167 B1 | 6/2002 | Sakakibara .................. 320/132 |
| 6,433,517 B1 | 8/2002 | Sakakibara .................. 320/153 |
| 6,476,584 B1 | 11/2002 | Sakakibara .................. 320/150 |
| 6,563,290 B1 | 5/2003 | Sakakibara et al. ......... 320/106 |
| 6,603,288 B1 | 8/2003 | Sakakibara .................. 320/151 |

FOREIGN PATENT DOCUMENTS

JP  6-22466  1/1994

(Continued)

OTHER PUBLICATIONS

European Search Report; Dec. 8, 2004.

*Primary Examiner*—Karl D. Easthom
*Assistant Examiner*—Robert Gant
(74) *Attorney, Agent, or Firm*—Orrick, Herrington & Sutcliffe LLP

(57) ABSTRACT

Battery pack (10) may include rechargeable battery cells (12). Battery charger (20) may include power source circuit (100). Power source circuit (100) may be connected with an external power source and battery cells (12). The external power source may supply power to the power source circuit and then, the power source circuit may supply charging current to battery cells (12). Battery charger (20) may also include voltage detector (32, 33) for detecting the voltage input from the external power source to power source circuit (100). Battery charger (10) may further include processor (40) for controlling power source circuit (32). Processor (40) may determine the amount of charging current supplied to battery cells (12) based upon the external power source voltage detected by the voltage detector (32, 33).

6 Claims, 5 Drawing Sheets

FOREIGN PATENT DOCUMENTS

| | | |
|---|---|---|
| JP | 6-121467 | 4/1994 |
| JP | 8-37035 | 2/1996 |
| JP | 8-84438 | 3/1996 |
| JP | 11-355972 | 12/1999 |
| JP | 2000-23387 | 1/2000 |
| JP | 2000-277166 | 10/2000 |
| JP | 2001-24538 | 9/2001 |
| JP | 2001-245438 | 9/2001 |

* cited by examiner

FIG. 5

|  |  | Diode Temperature [°C] | | |
|---|---|---|---|---|
|  |  | ~T1 | T1~T2 | T2~ |
| Input Voltage [V] | V2~ | MAX Im | MAX Im | MAX I3 |
|  | V1~V2 | MAX Im | MAX I3 | MAX I2 |
|  | ~V1 | MAX I1 | | |

※ T1＜T2, V1＜V2, I1＜I2＜I3···＜Im

BATTERY CHARGERS

CROSS REFERENCE

This application claims priority to Japanese patent application number 2003-6354, filed Jan. 14, 2003, the contents of which are hereby incorporated by reference as if fully set forth herein.

BACKGROUND OF THE INVENTION

1. Field of the Invention

The present invention relates to battery chargers for charging rechargeable batteries.

2. Description of the Related Art

Japanese Laid-open Patent Publication No. 2000-23387 describes a battery charger that suppresses the temperature increase of a power source circuit in the battery charger. This known battery charger includes a temperature sensor for detecting the temperature of the power source circuit and a switch electrically connecting and disconnecting the battery with the power source circuit. When the temperature of the power source circuit detected by the temperature sensor exceeds a predetermined value, the switch is turned OFF. As a result, the supply of charging current to the battery from the power source circuit is halted, thereby suppressing the temperature increase of the power source circuit.

SUMMARY OF THE INVENTION

In the known battery charger, the temperature of the power source circuit is detected by the temperature sensor. Consequently, the temperature sensor must be installed at a suitable position (i.e., in the vicinity of a component in the power source circuit that heats readily). However, due to the demands of miniaturizing the battery charger and constraints on the configuration of the power source circuit, there are limitations on where the temperature sensor can be installed. As a result, in those situations where the temperature sensor must be installed at a position removed from the readily heated component, the temperature of the power source circuit cannot be detected accurately, and the switch cannot tripped when the battery should be disconnected from the power source circuit.

It is, accordingly, one object of the present teachings is to provide improved battery chargers capable of reliably suppressing the temperature increase of the power source circuit even if the temperature sensor cannot be disposed in a suitable position.

In one aspect of the present teachings, a battery pack may include one or more rechargeable battery cells (e.g., nickel metal hydride battery cells, nickel cadmium battery cells). The battery pack may be coupled to appliances (e.g., cordless power tools, cordless electric vacuum cleaner). When the battery pack is discharged, the battery pack may be preferably detached from the appliance and coupled to a battery charger. The battery charger may have a power source circuit that is coupled to an external power source (e.g., alternating current) and the battery cells of the battery pack. The power source circuit may transform voltage input from the external power source and supply charging current to the battery cells. The battery charger may include a voltage detector for detecting the voltage input from the external power source into the power source circuit. For example, the voltage detector may monitor the voltage input to the power source circuit, and output signals from the power source circuit in accordance with the input voltage.

The battery charger may further include a controller (e.g., processor, microprocessor or microcomputer). The controller may determine the amount of charging current supplied to the battery cells based at least upon the input voltage (i.e., the external power source voltage) detected by the voltage detector. For example, by monitoring the voltage input to the power source circuit, the controller may determine whether the temperature of the power source circuit has increased. That is, in the case where the voltage input to the power source circuit from the external power source is low, the load on the power source circuit is greater than in the case where the voltage input to the power source circuit is high, and the temperature of the power source circuit tends to increase. Thus, if the controller determines, from the voltage detected by the voltage detector, an increase in the temperature of the power source circuit, the controller may modify the charging current supplied to the battery cells. By this means, the temperature increase of the power source circuit can be suppressed.

In another aspect of the present teachings, the battery charger may further include a first temperature sensor for detecting the temperature of the power source circuit. The controller may preferably determine the charging current supplied to the battery cells based further upon power source temperature from the first temperature sensor. Since the charging current is determined based upon the input voltage and the power source circuit temperature, the controller can accurately determine whether the temperature of the power source circuit has increased.

In another aspect of the present teachings, the battery pack may have a second temperature sensor for detecting the temperature of the battery cells. The controller may preferably determine the charging current supplied to the battery cells based upon the input voltage detected by the voltage detector and battery temperature detected by the second temperature sensor. For example, the controller preferably (1) determines a first charging current value based upon the input voltage, (2) determines a second charging current value based upon the battery temperature from the second temperature sensor, and (3) selects the smaller of the first and second charging current values as the charging current that will be supplied by the power source circuit to the battery cells. Since the charging current is determined based upon the input voltage and the battery temperature, the battery cells can be charged efficiently while the both temperature increases of the power source circuit and the battery cells can be reduced.

In another aspect of the present teachings, the power source circuit may comprise a transformer and a switch electrically connecting and disconnecting the external power source with the transformer. Preferably, the switch may be intermittently turned ON and OFF in order to increase or decrease the current per unit time supplied by the external power source to the transformer. Also, the transformer may preferably comprise a primary winding coupled to the external power source circuit and a first secondary winding coupled to the battery cells. Thus, the external power source circuit and battery cells can be mutually isolated.

In another aspect of the present teachings, the transformer may further comprise a second secondary winding coupled to the voltage detector. The voltage detector may preferably detect the voltage of the second secondary winding. The controller may determine the input voltage based upon the voltage of the second secondary winding detected by the voltage detector. In this aspect, the voltage input from the external power source to the power source circuit can be accurately measured at the secondary winding side of the transformer.

These aspects and features may be utilized singularly or, in combination, in order to make improved battery charger. In addition, other objects, features and advantages of the present teachings will be readily understood after reading the following detailed description together with the accompanying drawings and claims. Of course, the additional features and aspects disclosed herein also may be utilized singularly or, in combination with the above-described aspect and features.

BRIEF DESCRIPTION OF THE DRAWINGS

FIG. 5 is an explanatory drawing showing the contents of a map for determining allowable current values.

DETAILED DESCRIPTION OF THE INVENTION

Detailed Representative Embodiment

Figure 1:
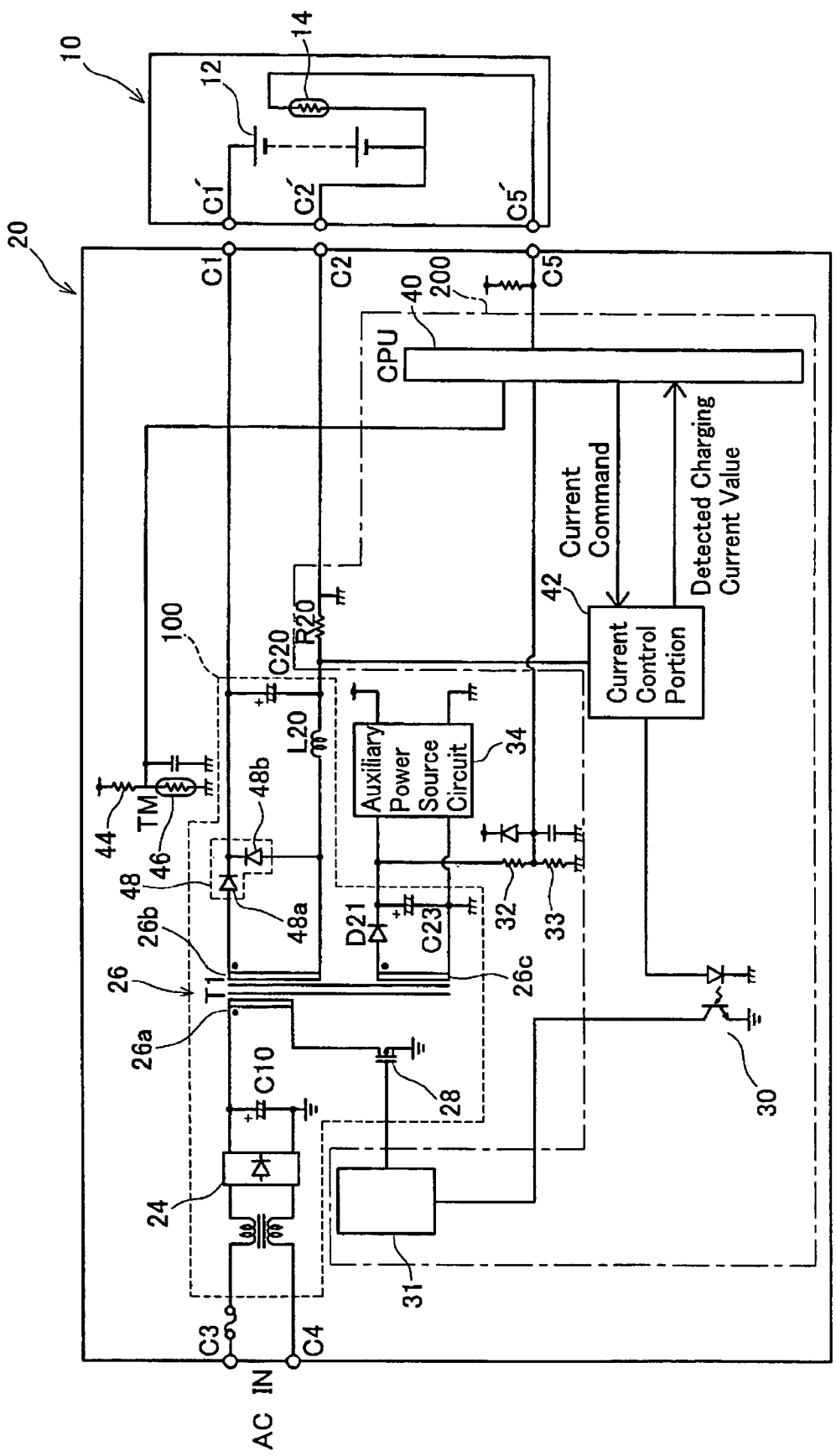
FIG. 1 is a block diagram schematically showing a representative circuit of a battery charger according to a representative embodiment of the present teachings.

A battery charger according to a representative embodiment of the present teachings will be explained with reference to the drawings. FIG. 1 is a block diagram schematically showing a circuit for a battery charger 20 and a battery pack 10. As shown in FIG. 1, when battery pack 10 is connected with battery charger 20, connecting terminals C1, C2, C5 of battery charger 20 make contact with connecting terminals C1', C2', C5' respectively of battery pack 10, and electrical contact is thereby established between battery charger 20 and battery pack 10. Battery pack 10 may include a plurality of nickel metal hydride batteries 12 (i.e., nickel metal hydride battery cells) that are serially connected. Battery pack 10 may also include temperature sensor 14 for detecting the temperature of batteries 12. Temperature sensor 14 may comprise a thermister having an electrical resistance that varies in accordance with variation in temperature. Batteries 12 and temperature sensor 14 are disposed within a housing of battery pack 10. Connecting terminals C1', C2', C5' are disposed on a surface of the housing of battery pack 10.

The charging circuit of battery charger 20 may include power source circuit 100 and charging-current control circuit 200 for controlling power source circuit 100. Power source circuit 100 can be connected with an external power source (e.g., an external commercial alternating current power source or an alternating current generator) via connecting terminals C3 and C4. Power source circuit 100 can also be connected with batteries 12 via connecting terminals C1, C2 and C1' and C2'. The external power source supplies power to power source circuit 100. Power source circuit 100 supplies charging current to batteries 12.

Power source circuit 100 may include switching transformer 26 which may comprise primary winding 26a, first secondary winding 26b and second secondary winding 26c.

Primary winding 26a of switching transformer 26 may be connected with the external power source via rectifying circuit 24, which may comprise a diode bridge, and smoothing circuit C10, which may be a condenser. The alternating current from the external power source may be rectified by rectifying circuit 24 and, further, smoothed by smoothing circuit C10, thereby being transformed into a direct current. The transformed direct current may be supplied to one end of primary winding 26a of switching transformer 26. Switch 28, which may be a field effect transistor (FET), may be coupled to the other end of primary winding 26a. Switch 28 may control the amount of current that is supplied to primary winding 26a.

First secondary winding 26b of switching transformer 26 may be connected with batteries 12 of battery pack 10 via rectifying circuit 48, which may comprise diodes 48a and 48b, and a smoothing circuit, which may comprise condenser C20 and inductor L20. The alternating current from first secondary winding 26b may be rectified by rectifying circuit 48 and smoothed by the smoothing circuit, thereby being transformed into a direct current. Temperature sensor 46 for detecting the temperature of power source circuit 100 may preferably be disposed in the vicinity of rectifying circuit 48 of power source circuit 100. Temperature sensor 46 may include a thermister having an electrical resistance that varies in accordance with variation in temperature. Temperature sensor 46 may be connected in series with resistor 44. Thus, when the temperature of rectifying circuit 48 (i.e., diodes 48a, 48b) increases, the impedance of temperature sensor 46 decreases, and the voltage divided by temperature sensor 46 and resistor 44 changes. The divided voltage may be input to microcomputer 40 of charging-current control circuit 200. Microcomputer 40 may detect the temperature of rectifying circuit 48 on the basis of the voltage divided by temperature sensor 46 and resistor 44.

As is clear from the above, the primary side and the secondary side of switching transformer 26 are mutually isolated. That is, connecting terminals C3 and C4, which can be connected with the external power source, and connecting terminals C1 and C2, which can be connected with battery pack 10, are mutually isolated. However, when the external power source is connected with connecting terminals C3 and C4 of battery charger 20 and battery pack 10 is connected with connecting terminals C1 and C2 of battery charger 20, a charging current is supplied to batteries 12.

Second secondary winding 26c of switching transformer 26 may be coupled to auxiliary power source circuit 34 via diode D21 and condenser C23. Diode D21 and condenser C23 may rectify and smooth the alternating voltage from second secondary winding 26c. Both ends of condenser C23 may be coupled to auxiliary power source circuit 34. Auxiliary power source circuit 34 may supply power to microcomputer 40.

Figure 2:
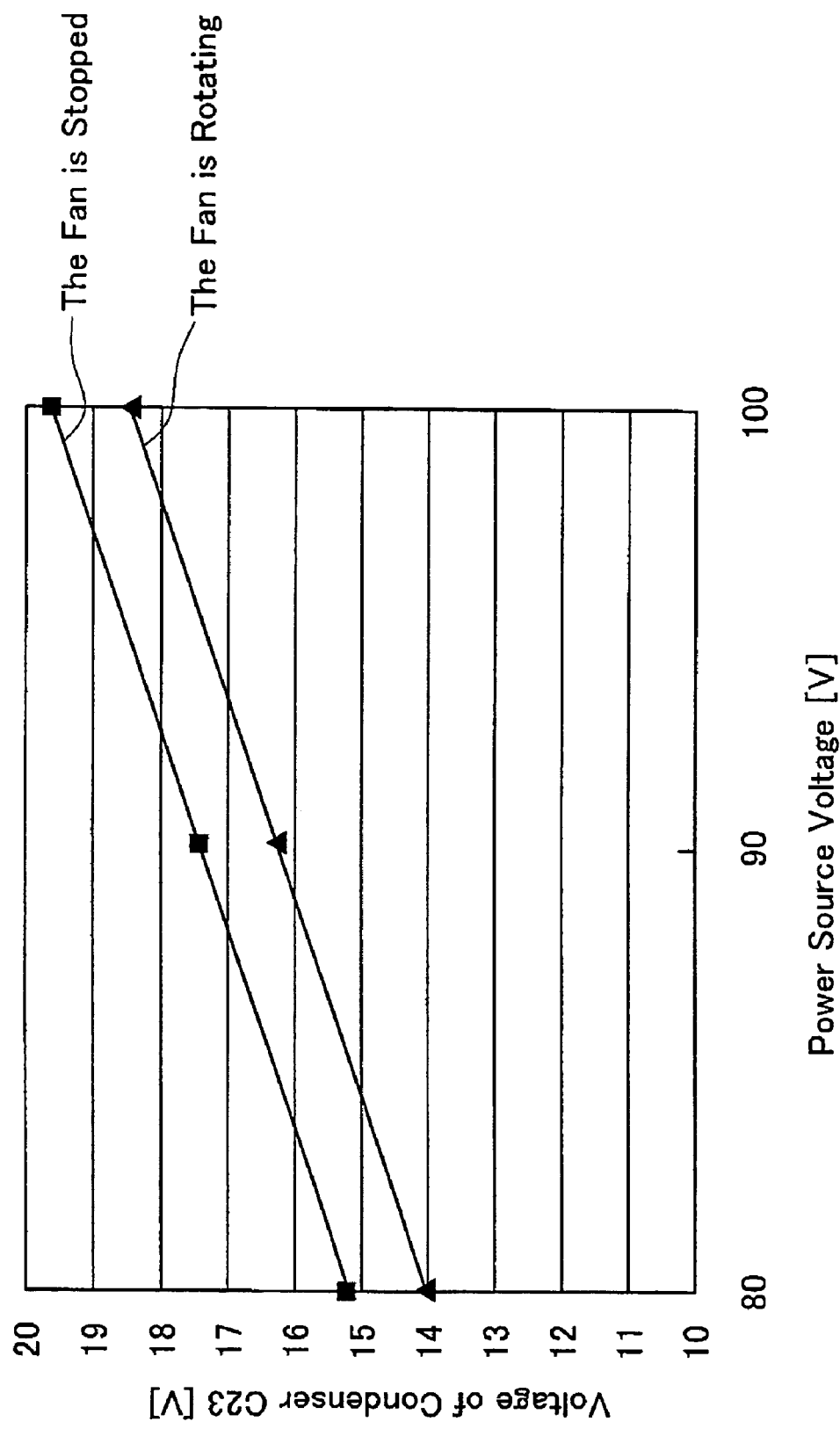
FIG. 2 is a graph showing the relationship between power source voltage and voltage of condenser C23 of FIG. 1.

The voltage that is output from first secondary winding 26b is affected by the battery voltage of batteries 12. However, the voltage of both ends of condenser C23 (i.e., the voltage output from second secondary winding 26c) is not greatly affected by the battery voltage of batteries 12. The voltage of the condenser C23 has a linear relationship with the voltage of primary side of switching transformer 26 (i.e., the voltage of the external power source). FIG. 2 shows the relationship between the voltage of the external power source, which is connected with battery charger 20, and the voltage of both ends of condenser C23. Further, since battery charger 20 has a fan (not shown in FIG. 1) for cooling power source circuit 100, both the observed results from when the fan is rotating and the observed results from when the fan is halted are shown in FIG. 2. As shown in FIG. 2, irrespective of whether the fan is rotating or not, the voltage of condenser C23 has a linear relationship with the voltage of the external power source. Consequently, the voltage of the external power source can be detected by detecting the voltage of condenser C23. In the present representative embodiment, the voltage of the external power source, which is connected with battery charger 20, is detected by detecting the voltage of condenser C23. For example, as shown in FIG. 1, resistors 32 and 33 may be connected in parallel with condenser C23, and resistors 32 and 33 may divide the voltage of condenser C23. The voltage divided by resistors 32 and 33 may be input to microcomputer 40. Microcomputer 40 may detect the voltage of the external power source on the basis of the divided voltage of condenser C23.

Charging-current control circuit 200 may comprise microcomputer 40, current control portion 42, opto-coupler 30, PWM (pulse width modulation) control circuit 31, and a resistor R20. Microcomputer 40 may include, e.g., CPU, ROM, RAM and I/O (interface). Microcomputer 40 may be connected with temperature sensor 14 of battery pack 10 via connecting terminals C5 and C5'. Thus, the signals from temperature sensor 14 of battery pack 10 may be input to microcomputer 40. Microcomputer 40 detects the temperature of batteries 12 based on the signals input thereto from temperature sensor 14.

Utilizing the temperature of rectifying circuit 48 (hereafter referred to as diode temperature), and the voltage of the external power source (hereafter referred to as input power source voltage), microcomputer 40 may retrieve a map, which may be stored in ROM of microcomputer 40, and determine an allowable charging-current value that permits charging while suppressing an increase in the temperature of power source circuit 100. The allowable charging-current value, which is determined by microcomputer 40, may be selected among a plurality of predetermined charging-current values Ii (e.g., i=1 . . . m). Further, utilizing the temperature of batteries 12, microcomputer 40 may determine an output charging-current value that permits charging while suppressing an increase in the temperature of batteries 12. The output charging-current value, which is determined by microcomputer 40, may be selected among a plurality of predetermined charging-current values Ii (e.g., i=0 . . . n. Here, n=m or n>m). Then, microcomputer 40 may select the smaller of the allowable charging-current value and the output charging-current value, and output the selected charging-current value, which serves as a current instruction value, to current control portion 42. Methods for determining the output charging-current values based upon the battery temperature are known (e.g., Japanese Laid-open Patent Publication Nos. 6-121467, 11-252814, 2000-277166, 2001-245438) and thus, a detailed explanation will be omitted.

The configuration of the aforementioned map used for determining the allowable charging-current value will now be explained with reference to FIG. 5. As shown in FIG. 5, the map defines the variable charging current wherein the diode temperature is indicated along the horizontal direction of the map while the input power source voltage is indicated along the vertical direction. The allowable charging-current values that permit charging while suppressing the increase in temperature of the temperature of power source circuit 100 are then found in the Table shown in FIG. 5. Specifically, if the input power source voltage is low (e.g., V1), then, irrespective of the diode temperature, the allowable charging-current value (i.e., I1) is applied (lower side of the map).

If the input power source voltage is high (e.g., V2) and the diode temperature is low (e.g., T1), relatively high allowable charging-current value (e.g., Im) is applied (found in the upper left side of the map).

That is, if the charging current is high when the input power source voltage is low, the large amount of current is supplied to the primary side of switching transformer 26, and there is a greater increase in the temperature of switch 28 (i.e., the temperature of the primary side of switching transformer 26) than in the diode temperature (i.e., the secondary side of switching transformer 26). By applying the low charging current irrespective of the diode temperature, switch 28 is protected. On the other hand, when the input power source voltage is high, the temperatures of the primary side and the secondary side of switching transformer 26 have an approximately proportional relationship, and consequently the charging current is applied in accordance with the temperature of the secondary side of switching transformer 26 (i.e., the diode temperature). By applying the charging current in this manner, the temperature of the primary side of switching transformer 26 is prevented from becoming higher than the temperature of the secondary side of switching transformer 26, thereby preventing damage to the primary side of switching transformer 26.

Current control portion 42 may be coupled to microcomputer 40. Current control portion 42 may detect the value of the charging current supplied to batteries 12 from power source circuit 100, and output control signals to opto-coupler 30 so that the current value becomes the selected charging-current value output from microcomputer 40.

Opto-coupler 30 may be coupled to PWM control circuit 31, and output signals to PWM control circuit 31 while isolating the signals from current control portion 42. That is, the primary side and the secondary side of switching transformer 26 are isolated, opto-coupler 30 maintaining the isolation between the primary side and the secondary side while performing the function of transmitting information from the secondary side of switching transformer 26 to the primary side.

PWM control circuit 31 may be coupled to switch 28, and output PWM signals to switch 28 in order to control the duty ratio of switch 28 in response to the signals output from opto-coupler 30. Switch 28 may be switched ON or OFF by means of PWM control circuit 31, the current consequently flowing intermittently to primary winding 26a, whereby alternating voltage may be created in a secondary side (i.e., secondary windings 26b and 26c) of switching transformer 26.

Figure 3:
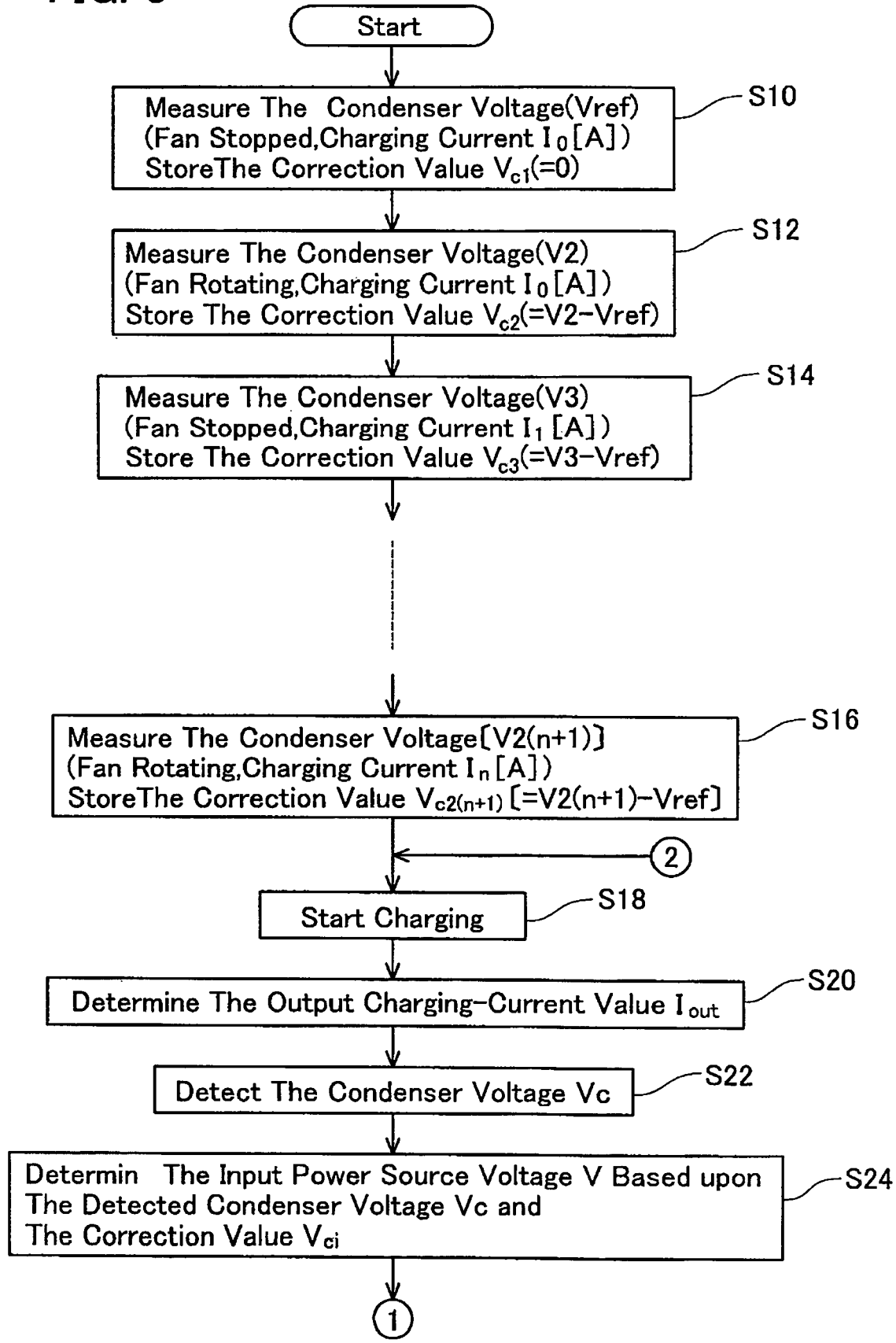
FIG. 3 is a flowchart showing process performed by a microcomputer of the battery charger of FIG. 1.
Figure 4:
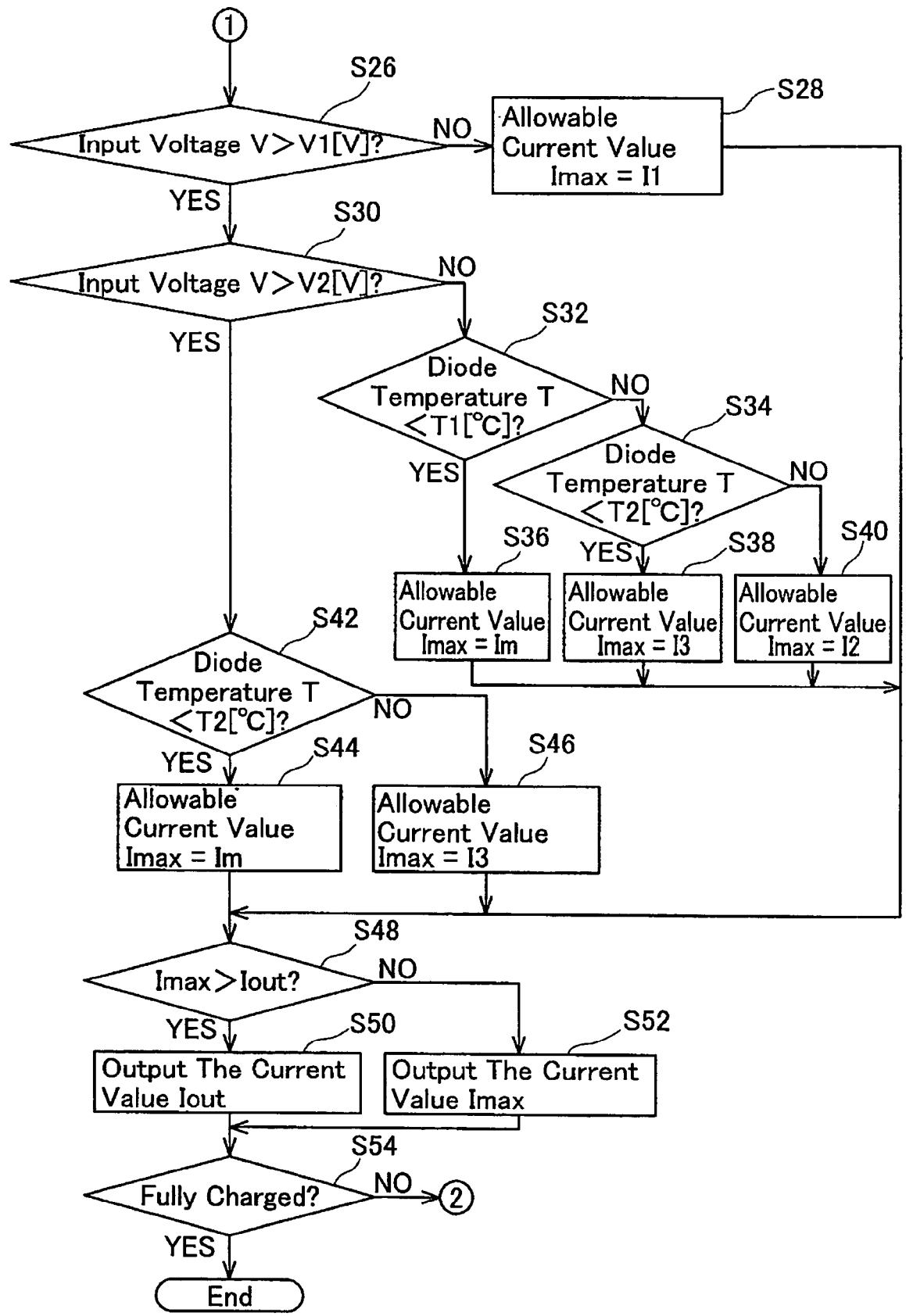
FIG. 4 is a flowchart showing process performed by the microcomputer of the battery charger.

The representative operation of battery charger 20 will now be explained with reference to FIGS. 3 and 4. FIGS. 3 and 4 show flowcharts of the processes performed by microcomputer 40 when battery pack 10 is attached to battery charger 20. As shown in FIG. 3, microcomputer 40 first measures the voltage of the condenser C23 in the case where the charging current to batteries 12 is equal to the current value I0 and the fan is in a stopped state (step S10). In the following process, the voltage measured in step S10 is used as a reference voltage Vref. Then, microcomputer 40 calculates a correction value Vci (i=1), which is the difference between the reference voltage Vref and the voltage measured in Step S10, and stores the correction value Vci (i=1). Since the voltage measured in step S10 is the reference voltage Vref, the correction value Vc1 is equal to 0. Next, microcomputer 40 measures the voltage of the condenser C23 (hereafter referred to as input voltage V2) in the case where the charging current to batteries 12 is equal to the current value I0 and the fan is in an operating state (step S12). Then, microcomputer 40 calculates a correction value Vc2 (=Vref−V2), and the correction value Vc2 is stored.

In the same manner, for each of the charging-current values Ii (i=1, . . . , n), microcomputer 40 measures an input voltage V (2i+1) when the fan is not rotating, and stores a correction value Vc (2i+1). Also, for each of the charging-current values Ii (i=1, . . . , n), microcomputer 40 measures an input voltage V (2i+2) when the fan is rotating, and stores a correction value Vc (2i+2) (steps S14 to S16). By means of the process of the steps S10 to S16, the correction values Vci of each type of status (i.e., the rotation or non-rotation of the fan, the charging-current values Ii) are stored. By this means, the voltage of the condenser C23 that is detected during charging is corrected as correction values Vci, allowing the voltage of the external power source to be retrieved accurately.

When the process proceeds to step S18, microcomputer 40 enables supply of charging current to batteries 12 of battery pack 10 (step S18). The charging current supplied to batteries 12 when charging begins is equal to the current value I0. Then the initial current value I0 is corrected in accordance with the diode temperature T and the external power source voltage.

Next, microcomputer 40 determines the output charging-current value Iout based upon the battery temperature (S20). That is, microcomputer 40 detects the battery temperature based upon the signals from temperature sensor 14 of battery pack 10, and determines the output charging-current value Iout on the basis of the detected battery temperature. Next, microcomputer 40 detects the voltage of condenser C23 (step S22). Then, microcomputer 40 determines the input power source voltage V based upon the voltage Vc measured at step S22 and the correction value Vci which are determined from the current status of the fan and the actual current value detected by current control portion 42 (step S24). For example, when the fan is stopped and the current value of the detected charging current is I0, the correction value Vc1 is used for determining the input power source voltage V.

After microcomputer 40 determines the input power source voltage V, the process proceeds to step S26 shown in FIG. 4. In step S26, microcomputer 40 determines whether the input power source voltage V is larger than a predetermined threshold value V1 (i.e., the value specified in the map, see FIG. 5). If the input power source voltage V is less than the threshold value V1 ("NO" in step S26), microcomputer 40 selects I1 as the allowable charging-current value Imax (step S28), and the process proceeds to step S48. Alternatively, when the input power source voltage V exceeds the threshold value V1 ("YES" in step S26), microcomputer 40 further determines whether the input power source voltage V exceeds a predetermined threshold value V2 (i.e., the value specified in the map, see FIG. 5) (step S30).

If the input power source voltage V is less than the threshold value V2 ("NO" in step S30), microcomputer 40 determines whether the diode temperature T, which is detected by temperature sensor 46, is less than a predetermined threshold value T1 (i.e., the value specified in the map, see FIG. 5) (step S32). When the diode temperature T is less than the threshold value T1 ("YES" in step S32), microcomputer 40 selects Im as the allowable charging-current value Imax (step S36), and the process proceeds to step S48. If the diode temperature T is greater than the threshold value T1 ("NO" in step S32), microcomputer 40 further determines whether the diode temperature T is less than a predetermined threshold value T2 (i.e., the value specified in the map, see FIG. 5) (step S34). If the diode temperature T is greater than the threshold value T2 ("NO" in step S34: "NO"), microcomputer 40 selects I2 as the allowable charging-current value Imax (step S40). If the diode temperature T is less than the threshold value T2 ("YES" in step S34), microcomputer 40 selects I3 as the allowable charging-current value Imax (step S38).

Further, in the case where the step S30 is "YES" (i.e., the case where the input power source voltage V exceeds the threshold value V2), the process proceeds to step S42. In step S42, microcomputer 40 determines whether the diode temperature T is less than the threshold value T2. If the diode temperature T is greater than the threshold value T2 ("NO" in step S42), microcomputer 40 selects I3 as the allowable charging-current value Imax (step S46). When the diode temperature T is less than the threshold value T2 ("YES" in step S34), microcomputer 40 selects Im as the allowable charging-current value Imax (step S44).

After the allowable charging-current value has been determined by means of the processes in steps S26 to S46, microcomputer 40 determines whether the allowable charging-current value Imax exceeds the output charging-current value Iout that has been determined in step S20 (step S48). If the allowable charging-current value Imax exceeds the output charging-current value Iout ("YES" in step S48), microcomputer 40 outputs the output charging-current value Iout, which serves as a current instruction value, to current control portion 42 (step S50). On the other hand, when the allowable charging-current value Imax is less than the output charging-current value Iout ("NO" in step S48), microcomputer 40 outputs the allowable charging-current value Imax, which serves as a current instruction value, to current control portion 42 (step S52). On the basis of the charging-current value output from microcomputer 40 at step S52, current control portion 42 outputs signals to Opto-coupler 30. PWM control circuit 31 outputs PWM signals to switch 28 based upon the signals from opto-coupler 30. By this means, a desired charging current is supplied to batteries 12 of battery pack 10.

Proceeding to step S54, microcomputer 40 determines whether batteries 12 of battery pack 10 is fully charged. Methods for determining whether batteries 12 are fully charged are known (e.g., the dT/dt method) and thus, a detailed explanation will be omitted. If batteries 12 is fully charged ("YES" in step S54), microcomputer 40 stops the supply of charging current to batteries 12. Alternatively, when batteries 12 is not fully charged ("NO" in step S54), the process returns to step S18 (shown in FIG. 3), and the processes from step S18 onwards are repeated.

As is clear from the above, in the above illustrated representative embodiment, when the voltage from the external power source that is input to power source circuit 100 is low, the allowable charging-current value, which is a maximum charging current that can be supplied to batteries 12, is set to be low. As a result, heating of the elements of power source circuit 100 can be suppressed. Furthermore, by this means, the capacity of switch 28 and diodes 48a, 48b can be low, thereby allowing the cost of battery charger 20 to be low.

Moreover, in the present representative embodiment, the explanation was given using, as an example, the process for charging a nickel metal hydride battery. However, the battery charger and charging method of the present teachings can also be applied to the charging of other rechargeable batteries (e.g., nickel cadmium batteries).

Finally, although the preferred representative embodiment has been described in detail, the present embodiment is for illustrative purpose only and not restrictive. It is to be understood that various changes and modifications may be made without departing from the spirit or scope of the appended claims. In addition, the additional features and aspects disclosed herein also may be utilized singularly or in combination with the above aspects and features.

The invention claimed is:

1. A battery charger adapted to supply current to a removable battery pack comprising battery cells and a charging terminal, comprising:
   a first terminal for coupling to an external power source;
   a second terminal for coupling to the charging terminal of the battery pack;
   a power source circuit coupled to the first terminal and the second terminal, the power source circuit transforming voltage input from the external power source, and supplying charging current to the battery cells;
   a voltage detector detecting the voltage input from the external power source to the power source circuit;
   a processor coupled to the voltage detector and the power source circuit, the processor determining the amount of charging current supplied to the second terminal based at least upon the external power source voltage detected by the voltage detectors;
   a first temperature sensor coupled to the power source circuit, wherein the processor determines the charging current supplied to the second terminal based further upon power source circuit temperature sensed by the first temperature sensor;
   a second temperature sensor coupled to the battery cells, wherein the processor is coupled to the second temperature sensor, the processor determining the charging current supplied to the second terminal based further upon battery temperature sensed by the second temperature sensor;
   the processor (1) determines a first charging current value based upon the external power source voltage and the power source circuit temperature, (2) determines a second charging current value based upon the battery temperature sensed by the second temperature sensor, and (3) selects the smaller of the first and second charging current values as the charging current that will be supplied by the power source circuit to the battery cells;
   wherein the power source circuit includes a transformer which comprises a primary winding coupled to the first terminal, a first secondary winding coupled to the second terminal and a second secondary winding coupled to the voltage detector, and wherein the processor determines the external power source voltage based upon the voltage of the second secondary winding detected by the voltage detector.

2. A battery charger as in claim 1, wherein the power source circuit further comprises a switch electrically connecting and disconnecting the first terminal with the transformer, wherein the switch is intermittently turned ON and OFF in order to increase or decrease current per unit time supplied by the external power source to the transformer.

3. A battery charger as in claim 2, further comprising a switching circuit that repeatedly switches the switch between an ON-state and an OFF-state in order to supply the charging current, which is determined by the processor, to the battery cells.

4. An apparatus comprising:
   a battery pack comprising battery cells;
   a battery charger comprising a power source circuit that transforms voltage input from an external power source and supply charging current to the battery cells, means for detecting the voltage input from the external power source to the power source circuit, and a processor that determines the amount of charging current supplied to the battery cells based at least upon the external power source voltage detected by the detecting means;
   a first temperature sensor coupled to the power source circuit, wherein the processor determines the charging current supplied to the battery cells based further upon power source temperature sensed by the first temperature sensor;
   and a second temperature sensor coupled to the battery cells, wherein the processor determines the charging current supplied to the battery cells based further upon battery temperature sensed by the second temperature sensor;
   wherein the processor further (1) determines a first charging current value based upon the external power source voltage and the power source circuit temperature, (2) determines a second charging current value based upon the battery temperature sensed by the second temperature sensor, and (3) selects the smaller of the first and second charging current values as the charging current that will be supplied by the power source circuit to the battery cells,
   wherein the power source circuit includes a transformer which comprises a primary winding coupled to the first terminal, a first secondary winding coupled to the second terminal and a second secondary winding coupled to the voltage detector, and wherein the processor determines the external power source voltage based upon the voltage of the second secondary winding detected by the voltage detector.

5. A battery charger adapted to supply current to a removable battery pack comprising battery cells and a charging terminal, comprising:
   a first terminal for coupling to an external power source,
   a second terminal for coupling to the charging terminal of the battery pack,
   a power source circuit coupled to the first terminal and the second terminal, the power source circuit transforming voltage input from the external power source, and supplying charging current to the battery cells,
   a voltage detector detecting the voltage input from the external power source to the power source circuit,
   a processor coupled to the voltage detector and the power source circuit, the processor determining the amount of charging current supplied to the second terminal based at least upon the external power source voltage detected by the voltage detector;
   a first temperature sensor coupled to the power source circuit, wherein the processor determines the charging current supplied to the second terminal based further upon power source circuit temperature sensed by the first temperature sensor; and
   a second temperature sensor coupled to the battery cells, wherein the processor is coupled to the second temperature sensor, the processor determining the charging current supplied to the second terminal based further upon battery temperature sensed by the second temperature sensor;
   wherein the processor (1) determines a first charging current value based upon the external power source voltage and the power source circuit temperature, (2) determines a second charging current value based upon the battery temperature sensed by the second temperature sensor, and (3) selects the smaller of the first and second charging current values as the charging current that will be supplied by the power source circuit to the battery cells.

6. An apparatus comprising:
- a battery pack comprising battery cells;
- a battery charger comprising a power source circuit that transforms voltage input from an external power source and supply charging current to the battery cells, means for detecting the voltage input from the external power source to the power source circuit, and a processor that determines the amount of charging current supplied to the battery cells based at least upon the external power source voltage detected by the detecting means;
- a first temperature sensor coupled to the power source circuit, wherein the processor determines the charging current supplied to the battery cells based further upon power source temperature sensed by the first temperature sensor; and
- a second temperature sensor coupled to the battery cells, wherein the processor determines the charging current supplied to the battery cells based further upon battery temperature sensed by the second temperature sensor;
- wherein the processor further (1) determines a first charging current value based upon the external power source voltage and the power source circuit temperature, (2) determines a second charging current value based upon the battery temperature sensed by the second temperature sensor, and (3) selects the smaller of the first and second charging current values as the charging current that will be supplied by the power source circuit to the battery cells.

* * * * *